United States Patent
Zhao et al.

(10) Patent No.: US 11,720,108 B2
(45) Date of Patent: Aug. 8, 2023

(54) NATURAL LANGUAGE BASED INDOOR AUTONOMOUS NAVIGATION

(71) Applicant: Baidu USA LLC, Sunnyvale, CA (US)

(72) Inventors: Jinxin Zhao, Sunnyvale, CA (US); Liangjun Zhang, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 190 days.

(21) Appl. No.: 17/131,359

(22) Filed: Dec. 22, 2020

(65) Prior Publication Data

US 2022/0197288 A1    Jun. 23, 2022

(51) Int. Cl.
*G05D 1/02* (2020.01)

(52) U.S. Cl.
CPC ... *G05D 1/0212* (2013.01); *G05D 2201/0211* (2013.01)

(58) Field of Classification Search
CPC ......... G05D 1/0212; G05D 2201/0211; G05D 1/0088; G05D 1/0221; G05D 1/0274; G05D 1/0016; G05D 1/0219; G06F 40/216; G06F 40/284; G06F 40/30; G01C 21/005; G01C 21/206; G01C 21/383; B25J 9/1664; B25J 9/1684
USPC .......................................................... 701/26
See application file for complete search history.

(56) References Cited

U.S. PATENT DOCUMENTS

| | | | | |
|---|---|---|---|---|
| 6,219,616 B1 * | 4/2001 | Litmanovich | ........ | G01C 21/188 701/512 |
| 10,606,898 B2 * | 3/2020 | Tellex | ..................... | G06N 7/005 |
| 11,131,993 B2 * | 9/2021 | Singh | ..................... | G05D 1/0221 |
| 11,155,259 B2 * | 10/2021 | Yao | ........................ | B60W 30/09 |
| 2017/0219353 A1 * | 8/2017 | Alesiani | ............... | G05D 1/0217 |
| 2018/0283882 A1 * | 10/2018 | He | ...................... | G01C 21/3407 |
| 2018/0307779 A1 * | 10/2018 | Tellex | ..................... | G06F 40/42 |

(Continued)

FOREIGN PATENT DOCUMENTS

| | | |
|---|---|---|
| CN | 110825829 A | 2/2020 |
| JP | H02-172000 | 7/1990 |

(Continued)

OTHER PUBLICATIONS

Garcia, N., Damask, A., Physical Quantities. In: Physics for Computer Science Students, 1991, Springer Study Edition. Springer, New York, NY. pp. 16-17 (Year: 1991).*

(Continued)

*Primary Examiner* — Vivek D Koppikar
*Assistant Examiner* — Dominick Mulder
(74) *Attorney, Agent, or Firm* — Knobbe, Martens, Olson & Bear, LLP (57) ABSTRACT

A scalable solution to robot behavioral navigation following natural language instructions is presented. An example of the solution includes: receiving, by a pre-trained sequential prediction model, a navigation graph of the task environment, instructions in natural language and an initial location of the robot in the navigation graph, wherein the navigation graph comprises nodes indicating locations in the task environment, coordinates of the nodes, and edges indicating connectivity between the locations; and predicting sequentially, by the pre-trained sequential prediction model, a sequence of single-step behaviors executable by the robot to navigate the robot from the initial location to a destination.

14 Claims, 5 Drawing Sheets

(56) References Cited

U.S. PATENT DOCUMENTS

| | | | |
|---|---|---|---|
| 2019/0035096 A1* | 1/2019 | Huang | B25J 19/023 |
| 2019/0094870 A1* | 3/2019 | Afrouzi | G05D 1/0274 |
| 2020/0023514 A1* | 1/2020 | Tellex | G06N 7/005 |
| 2020/0198140 A1* | 6/2020 | Dupuis | G05D 1/0289 |
| 2020/0302250 A1* | 9/2020 | Chu | G06F 30/13 |
| 2021/0041243 A1* | 2/2021 | Fay | B25J 9/1664 |
| 2021/0069905 A1* | 3/2021 | Zhang | B25J 9/1661 |
| 2021/0403051 A1* | 12/2021 | Jaegal | B60W 40/02 |
| 2022/0073101 A1* | 3/2022 | Wang | G01C 21/343 |
| 2022/0092456 A1* | 3/2022 | Piot | G06N 3/0454 |

FOREIGN PATENT DOCUMENTS

| | | |
|---|---|---|
| JP | H04-372985 | 12/1995 |
| JP | 2010-531461 | 12/2008 |
| JP | 2015-212706 A | 11/2015 |
| JP | 2017-053683 | 3/2017 |
| WO | WO 2020/069160 | 4/2020 |
| WO | WO 2020/194253 | 10/2020 |

OTHER PUBLICATIONS

Extended European Search Report received in Application No. 21179395.5, dated Oct. 7, 2021 in 10 pages.

Cunjun Yu et al., "Spatio-Temporal Graph Transformer Networks for Pedestrian Trajectory Prediction", arxiv.org, Cornell University Library, dated Jul. 24, 2020 in 19 pages.

Pengpeng Zhou et al., "Translating Natural Language Instructions for Behavioral Robot Indoor Navigation with Attention-History Based Attention", Proceedings of the $2^{nd}$ International Scientific Conference on Innovations in Digital Economy, dated Dec. 11-13, 2020 in 5 pages.

* cited by examiner

NATURAL LANGUAGE BASED INDOOR AUTONOMOUS NAVIGATION

TECHNICAL FIELD

The present disclosure relates to the field of computer technology, particularly to an indoor autonomous navigation, and more particularly to a method for navigating a robot in a task environment.

BACKGROUND

Currently, the autonomous navigation system used in most mobile robots relies on a fine-grained map of a task environment pre-established by scanning. During the navigation, in response to receiving a coordinate, a robot will search for a global path through a search algorithm, and then optimize the global path based on local observations to obtain a final planned path. However, when being located in a new environment, the existing mobile robot cannot executes the autonomous navigation immediately since a coordinate of the destination may not be known or a fine-grained map is not available.

SUMMARY

Embodiments of the present disclosure provide a method and apparatus for navigating a robot in a task environment, and a non-transitory medium.

In a first aspect, some embodiments of the present disclosure provide a method for navigating a robot in a task environment. The method includes: receiving, by a pre-trained sequential prediction model, a navigation graph of the task environment, instructions in natural language and an initial location of the robot in the navigation graph, where the navigation graph comprises nodes indicating locations in the task environment, coordinates of the nodes, and edges indicating connectivity between the locations; and predicting sequentially, by the pre-trained sequential prediction model, a sequence of single-step behaviors executable by the robot to navigate the robot from the initial location to a destination.

In a second aspect, some embodiments of the present disclosure provide an electronic device, the electronic device comprises at least one processor; and a memory storing instructions executable to cause the at least one processor to perform the method for navigating a robot in a task environment according to any one of the embodiment in the first aspect.

In a third aspect, some embodiments of the present disclosure provide a non-transitory computer readable storage medium storing a computer program executable to cause a processor to perform the method for navigating a robot in a task environment according to any one of the embodiment in the first aspect.

BRIEF DESCRIPTION OF THE DRAWINGS

By reading the detailed description of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

Figure 1:
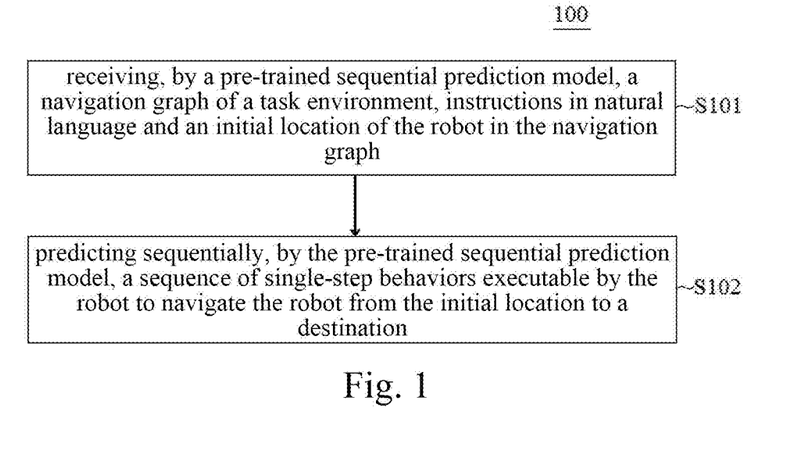
FIG. 1 is a flowchart of a method for navigating a robot in a task environment according to an embodiment of the present disclosure.

FIG. 1 is a flowchart of a method for navigating a robot in a task environment according to an embodiment of the present disclosure. The method disclosed in embodiments of the present disclosure may be performed by an apparatus for navigating a robot in a task environment, which may be implemented in software and/or hardware, and may be integrated on any electronic device having computing capability, such as a server or a terminal.

As shown in FIG. 1, the method for navigating a robot in a task environment disclosed in an embodiment of the present disclosure may include a step S101 of receiving, by a pre-trained sequential prediction model, a navigation graph of a task environment, instructions in natural language and an initial location of the robot in the navigation graph; and a step S102 of predicting sequentially, by the pre-trained sequential prediction model, a sequence of single-step behaviors executable by the robot to navigate the robot from the initial location to a destination. Hereinafter, detailed descriptions will be made in reference to the two steps.

Figure 2A:
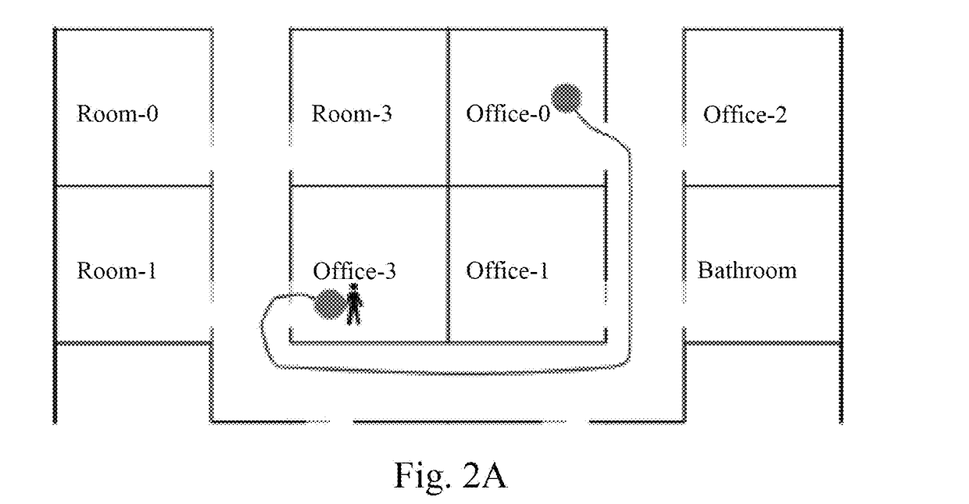
FIG. 2A is a schematic diagram of a task environment according to an embodiment.

Step S101:

A robot may be placed in an environment and need to be navigated across the environment. The environment that a robot needs to be navigated therein is referred to as a task environment. The task environment may be GPS-denied environments, indoor spaces, etc. A task environment is shown in FIG. 2A.

Figure 2B:
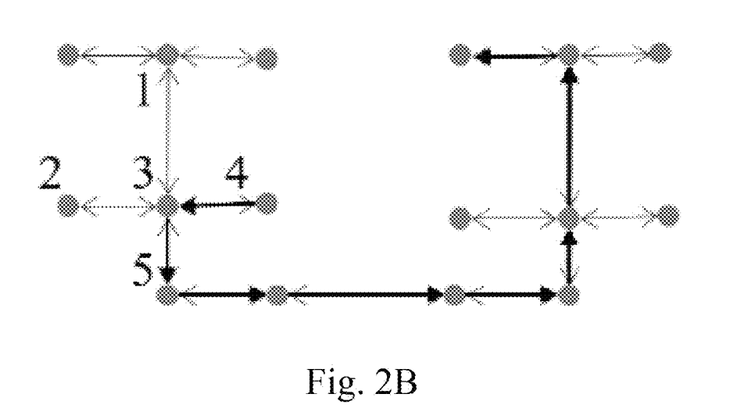
FIG. 2B is a schematic diagram of an embodiment of a navigation graph of the task environment shown in FIG. 2A.

When a robot follows a corridor, the robot only needs to know that it is moving along a space with the correct semantic meaning, but not necessarily with certain geometry specifications such as path width and curvature. Thus, the navigation of the robot across a task environment may be realized by representing the task environment as a topological map. The nodes in the topological map may refer to semantically meaningful locations such as rooms and corridors, while the edges may indicate connectivity. The topological map may be used as the navigation graph which is used for navigating the robot across the task environment. A navigation graph corresponding to the task environment of FIG. 2A is shown in FIG. 2B.

In some embodiments, the navigation graph is encoded with undirected edges together with node coordinates. The undirected edges may be illustrated in the navigation graph as non-directional or bi-directional edges. As an example, the undirected edges is shown as bi-directional edges in FIG. 2B.

The presentation of genuine geometric information in the navigational map enables one to interpret environmental knowledge adaptively based on actual navigation progress online. This may yield not only more compact, but more directed routing representations by filtering out information unessential at particular navigation progress.

In a scenario, just as shown in FIG. 2A, when a robot is located in Office-3 and need be navigated to Office-0, various sequences of instructions in natural language may be used for instructing the robot to move to the Office-0 along an expected route. An expected route has been illustrated in FIG. 2A as an example. The various sequences of instructions may include "Turn left after exiting the room. Move forward, turn left again, and follow the corridor. Turn left at the end and enter the second room to your left" or "Exit the room. Turn left and reach the end of the corridor. Turn left and go forward until you reach the end. Turn left. Move forward and reach the second room on the left." Although containing the same navigation semantics (i.e., "Exit", "turn left", "move", "turn left", etc.), these two sequences of instructions rely on different segmentation of the route and ordering of critical behaviors. The expected route for navigating the robot from the Office-3 to Office-0 is also illustrated in FIG. 2B. The node sequence 4-3-5- . . . illustrated in FIG. 2B is equivalent to the expected route shown in FIG. 2A.

In some embodiments, the navigation graph including nodes, coordinates of the nodes and edges between the nodes, the instructions in natural language and the initial location or initial node of the robot is input into a pre-trained sequential prediction model, for the sequential prediction model to generate a sequence of single-step behaviors based thereon, the sequence of single-step behaviors are executable by the robot to navigate the robot from the initial location (e.g. the Office 3) to a destination (e.g. the Office 0).

Step S102:

The sequential prediction model may be a neural network model pre-trained with annotated sample navigation graphs and corresponding sample instructions in natural language.

In some embodiments, the sequential prediction model predicts a sequence of single-step behaviors executable by the robot sequentially.

Figure 3:
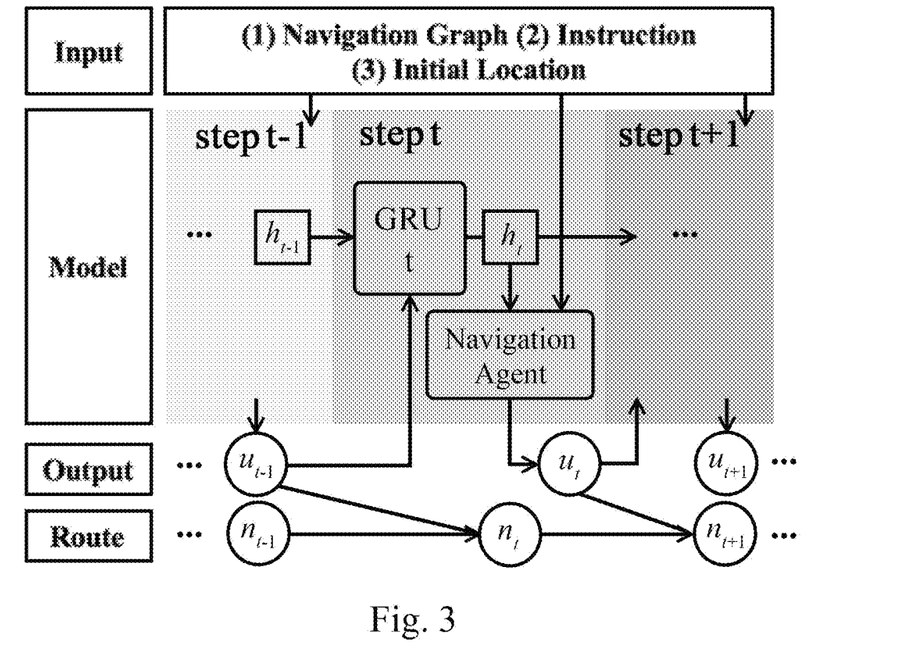
FIG. 3 is an schematic diagram of a method for predicting a sequence of single-step behaviors according to an embodiment of the present disclosure.

FIG. 3 illustrates an schematic diagram of the method for predicting a sequence of single-step behaviors according to an embodiment of the present disclosure. As shown in FIG. 3, the method for predicting a sequence of single-step behaviors takes three inputs: (1) a navigation graph G with undirected edges E, nodes N, and node coordinates X, (2) natural navigation instructions I, and (3) initial locations s∈N. The sequential prediction model may generate behavior sequence $u_{0:T-1}:=(u_0, u_{T-1})$ that a robot can execute to navigate from s to a goal state g as described in I.

During the training of the model, given training sample $\{(<G_i, l_i, s_i>, u_i)\}_{i=0}^{Ntrain}$, the goal is to infer behavior sequences that reflect the instructions in view of new navigation queries by solving $$\operatorname*{argmax}_{n} P(u \mid G, I, s) \tag{1}$$

Since the target is a high-level behavior plan, the goal states described by the instructions may only specify target locations but not desired heading directions. Thus, without loss of navigation capability, an embodiment of the present disclosure keeps a simplistic behavior set $B:=\{b_e$ (i.e., "exit"), $b_r$ (i.e., "turn right and move"), $b_l$ (i.e., "turn left and move"), and $b_f$ (i.e., "move forward")$\}$. The proposed solution is different from assigning a separate behavior for the same movement in each different situation, such as "Go straight at a T interaction" and "Go straight down the corridor." The compact behavior set helps the learning focus on matching instructions with navigation movements instead of specific environments, effectively improving generality.

Given an action sequence $u_{0:T-1}:=(u_0, \ldots, u_{T-1})$, the robot may take action $u_t$ at time t and relocates from node $n_t$ to $n_{t+1}$. The expected entire navigation starts from $n_0=s$ and terminates at goal state $n_T=g$. In some embodiments, each action $u_t$ can be classified to be $u_t=b \in B$ by comparing the robot heading before and after a movement, assuming that robot always head toward the direction of movement. Suppose at time t, the robot is at node $n_t$. Then, by calculating the cross product of heading of $\varnothing_t=x(n_t)-x(n_{t-t})$ and $\varnothing_{t+1}=x(n_{t+t})-x(n_t)$, we can classify the action $u_t$ as $$u_t = \begin{cases} b_e & \text{if } t=0 \\ b_r & \text{if } \phi_t \times \phi_{t+1} < -\xi \\ b_l & \text{if } \phi_t \times \phi_{t+1} > +\xi \\ b_f & \text{if } \phi_t \times \phi_{t+1} \in (-\xi, +\xi) \end{cases} \tag{2}$$

where $n_{t+1}$ may always different from $n_{t-1}$. Particularly, at t=0, the robot is assumed to be at a room node s and has only one valid behavior "exit". As such, a valid transition from $n_t$ to $n_{t+1}$ may be denoted as a tuple $<n_t, u_t, n_{t+1}>$ where $u_t$ is inferred according to the above Equation (2). A special behavior $b_s$ (i.e., "STOP") may be also encoded, taken by the robot at any time t to indicate navigation termination.

The sequential prediction model proposed in FIG. 3 is structured into two parts: a Gated Recurrent Unit (GRU) cell that keeps track of the navigation progress in the form of a hidden state $h_t$, and a navigation agent which selects the next action $u_t$. At each step, the GRU cell takes previous action $u_{t-1}$ as input and updates the hidden state $h_t$. The navigation agent combines navigation progress $h_t$, navigation graph G, and instruction I to select the next action $u_t$. The robot then moves from $n_t$ to $n_{t+1}$ according to $u_t$ and transition model defined by graph G. The same process repeats until the agent selects the action $b_s$ (i.e. "STOP"), indicating that the goal is reached. In other words, The proposed model solves a sequence of single-step action prediction problems, each of which depends on the solutions in previous steps.

In some embodiments, for each single step during the prediction, an adaptive context is generated by adapting the navigation graph to a current prediction process corresponding to the single step, and a single-step behavior is predicted for the current single step based on at least the generated adaptive context and the instructions in natural language. By adapting the navigation graph to an actual prediction process corresponding to the current single step, it obeys the observation that humans usually search for related information on a local horizon instead of paying equal attention across the whole map at all time when following navigation instructions. By adapting the navigation graph to an actual prediction process corresponding to the current single step and predicting the single-step behavior for the current single step based on the adapted context, the challenge on the flexible correspondence between instruction semantics and navigation plans is solved with limited scalability to new and large map.

In some embodiments, the knowledge base adaptation may be realized by the so called d-step action propagation. Other method for realizing knowledge base adaptation may also be adopted.

Figure 4:
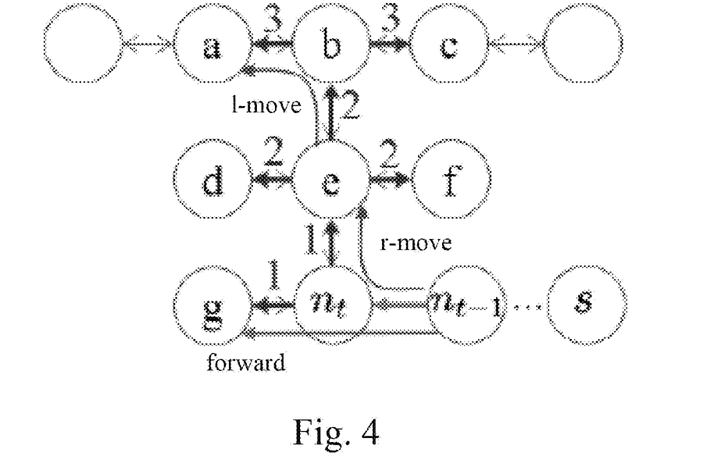
FIG. 4 is a schematic diagram of a 3-step action propagation according to an embodiment.

As an example, FIG. 4 shows a 3-step action propagation for generating an adaptive context $\hat{G}_t$. $\hat{G}_t$ is a subset of the full navigation graph G that only includes the valid navigation movements in a bounded look-ahead horizon depending on actual navigation progress $n_{0:t}$.

The connectivity information of graph G:=<E, N, X> may be written as a set of tuples $\{<n, b, n'>_i\}$, each representing a valid navigation behavior moving from node n to n' with type b. As described in Section, the valid behavior type b for directed edge <n, n'> depends on possible previous locations $n_{prev}$ of robot before reaching n. Thus, a transition <n, b, n'> can be alternatively written in previous-current-next format <$n_{prev}$, n, n'>, from which b can be inferred according to the above Eq. (2). To adapt the knowledge base G, we search for valid behaviors that can be taken in the next d steps. In other words, we simulate the robot movements continuing from the immediate history <$n_{t-1}$, $n_t$> and record any valid node transitions and their behavior types. We refer to such process as d-step action propagation hereafter. We implement this process as a bounded breadth-first-search over directed edges in G, taking <$n_{t-1}$, $n_t$> as the initial element. Each time we pop a directed edge <$n_{prev}$, n> from the queue, we collect all neighbors n' of n that is not $n_{prev}$. For each n', we add <n, n'> to the queue and compose a tuple <$n_{prev}$, n, n'>. The tuple is subsequently converted to graph format <n, b, n'> where the behavior type b is inferred from the coordinates x($n_{prev}$), x(n), and x(n) according to the above Eq. (2). All valid transitions where the distance between n' and current node $n_t$ is within d may be collected. This yields the adaptive context $\hat{G}_t$ at time step t. See Algorithm 1 for a summary of d-step action propagation algorithm.

Algorithm 1: d-step Action Propagation

Input: Current node n, previous node $n_{next}$, graph G, look-ahead steps d
Output: Adaptive context $\hat{G}$

```
1   function ActionPropagation(n, n_prev, G, d)
2   |  E, N, X ← G
3   |  Ĝ ← Ø, Q ← Ø
4   |  if n_prev then
5   |  |  Q ← Q ∪ {< n_prev, n >}          // t > 0
6   |  for d' = 1 to d do
7   |  |  Q' ← Ø
8   |  |  if Q == Ø then
9   |  |  |  n_next ← Neighbor(n)           // t = 0
10  |  |  |  Ĝ ← Ĝ ∪ {< n, b_e, n_next >}
11  |  |  |  Q' ← Q' ∪ {< n, n_next >}
12  |  |  else
13  |  |  |  forall < n_1, n_2 > in Q do
14  |  |  |  |  forall n_3 in Neighbor(n_2) \ {n_1} do
15  |  |  |  |  |  u ← b(n_1, n_2, n_3)     // Eq. (2)
16  |  |  |  |  |  Ĝ ← Ĝ ∪ {< n_2, u, n_3 >}
17  |  |  |  |  |  Q' ← Q' ∪ {< n_2, n_3 >}
```

Algorithm 1: d-step Action Propagation

```
18  |  |  Q ← Q'
19  |  return Ĝ
```

Figure 5:
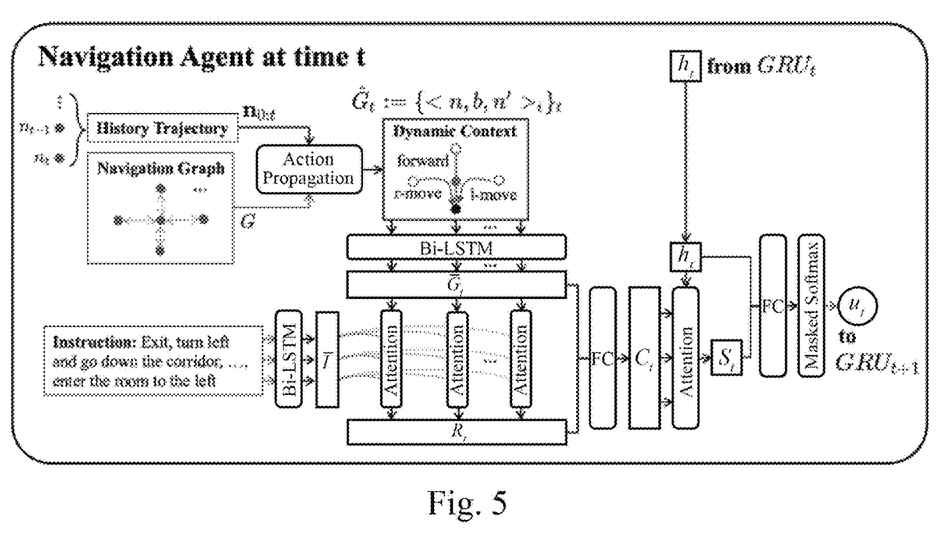
FIG. 5 is an schematic diagram of a navigation agent according to an embodiment of the present disclosure.

FIG. 5 is an schematic diagram of the navigation agent according to an embodiment of the present disclosure. The construction of the navigation agent mainly includes:

Context and Instruction Embedding: both navigation context $\hat{G}_t$ (or G in the static context case) and instructions I are encoded. Each of the transition tuple <n, b, n'> in $\hat{G}_t$ is encoded into a vector of length 2|N|+|B|, where |N| and |B| refer to the number of nodes in graph G and number of valid behaviors, respectively. The context $\hat{G}_t$ is finally encoded into a matrix of size $\mathbb{R}^{L_t \times (2|N|+|B|)}$, where $L_t$ refers to the number of transitions included in $\hat{G}_t$. The instructions I are encoded by token embedding from BERT's pre-trained model as a matrix of size $\mathbb{R}^{M \times d_{BERT}}$, where M refers to the maximum number of tokens in instructions.

Feature Extraction: the feature extraction is performed on both context and instruction embedding. In some embodiments, a multilayer bidirectional Gated Recurrent Units (GRUs) is used to generate context features $\overline{G}_t$ of size $\mathbb{R}^{L_t \times 2H}$, where H refers to the hidden size of GRUs. In some embodiments, an identical GRUs is used to generate instruction feature $\overline{I}$ of size $\mathbb{R}^{M \times 2H}$.

Context-Instruction Attention: now seek for correspondence between navigation context and instructions via attention mechanism. In some embodiments, a one-way attention where only context features attends to instruction features is used. Notably, under the setting of adaptive context, the attention mechanism resembles not only the way people search for paths on a map, but also the fact that people pay primary attention to the environment in proximity when deciding the next movement. This is particularly true when the instructions are based on local environments rather than global landmarks.

For each row $\overline{G}_{ti}$ of $\overline{G}_t$, we compute an attention distribution $w_{ti}$ to $\overline{I}$:

$$\omega_{ti} = softmax(\overline{G}_{ti} W \overline{I}_1^T, \cdots, \overline{G}_{ti} W \overline{I}_M^T) \quad (3)$$

where $W \in \mathbb{R}^{2H \times 2H}$ refers to trainable parameters. The attention vector $R_{ti}$ for each transition feature $\overline{G}_{ti}$ is then computed by:

$$R_{ij} = \sum_{j=1}^{M} \omega_{tij} \overline{I}_j \quad (4)$$

Aggregating all $R_{ti}$, an attention matrix $R_t$ of size let $\mathbb{R}^{L_t \times 2H}$ is obtained.

Progress-Aware Context: This section combines navigation context $\overline{G}_t$, instruction-attended features $R_t$, and current hidden state $h_t$ from the GRU cell at time t. First, $\overline{G}_t$ and $R_t$ are combined to compute a blended context and instruction feature:

$$C_t = [\overline{G}_t, R_t] W_C \quad (5)$$

where $w_C \in \mathbb{R}^{4H \times H}$ refers to the trainable parameters that reduce the feature dimension to H. Then, we attend the hidden state $h_t$ to $C_t$ to capture context features related to the current navigation progress. The attention weight $\alpha_t$ is computed following:

$$\hat{\alpha}_{ti} = v^T \tanh(W_1 h_t + W_2 C_{ti}) \quad (6)$$

$$\alpha_t = softmax(\hat{\alpha}_{t1}, \cdots, \hat{\alpha}_{tL_t}) \quad (7)$$

where $W_1, W_2 \in \mathbb{R}^{H \times H}$, $v \in \mathbb{R}^H$ are trainable parameter. The progress-aware context $S_t \in \mathbb{R}^H$ is then computed as $S_t = \Sigma_i^{L_t} \alpha_{ti} C_{ti}$.

Behavior Prediction: finally the progress aware context $S_t$ and hidden state $h_t$ are combined to generate the policy at time t. The raw action probability feature $\hat{b}_t$ is computed by concatenating $S_t$ with $h_t$ and feeding into a fully connected layer:

$$\hat{b}_t = W_3[S_t; h_t] \quad (8)$$

where $W_3 \in \mathbb{R}^{(|B|+1) \times 2H}$ refers to trainable parameters. The result is a preference vector $\hat{b}_t$ for each navigation behavior $b \in B$ as well as a special STOP action $b_s$ indicating task termination.

To generate the action $u_t$, a masked softmax function is applied:

$$O_t = \hat{b}_t + \text{mask}(G, n_{0:t})$$

$$u_t = \text{argmax}(\text{softmax}(O_t)) \quad (9)$$

In some embodiments, the input to the mask function includes the entire navigation graph G and navigation trajectory $n_{0:t}$ up to current step t. The function generates a zeros vector with same size as $\hat{b}_t$ where the invalid behaviors are replaced with $-\infty$. To decide whether a certain behavior b is valid, we check if there exists a neighbor node n' of $n_t$ satisfying:

$$n' \neq n_{t-1} \text{ and } b = b(n_{t-1}, n_t, n') \text{ by Eq. (2)} \quad (10)$$

In some embodiments, when $n_t = n_{t-1}$ (or $u_{t-1} = b_s$), a STOP action is enforced at time t since the navigation is already terminated. Notably, the valid action space at each step t is determined not only by the location $n_t$, but also by the history location $n_{t-1}$. This setting lifts the requirement for binding behavior semantics with locations, enabling both compact knowledge representation and flexible inference of behavior semantics.

Figure 6:
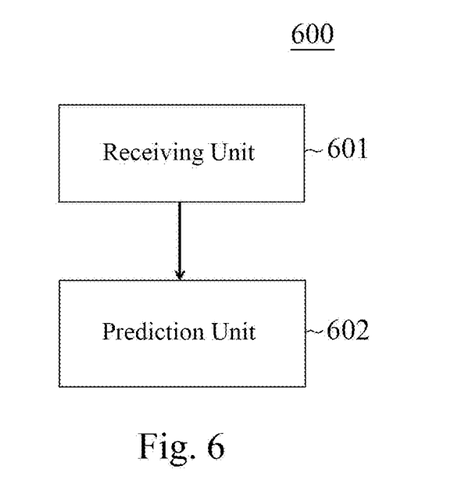
FIG. 6 is a schematic structural diagram of an apparatus for predicting a sequence of single-step behaviors according to an embodiment of the present disclosure.

With further reference to FIG. 6, as an implementation of the method for predicting a sequence of single-step behaviors, an embodiment of the present disclosure provides an apparatus for predicting a sequence of single-step behaviors, and the apparatus embodiment corresponds to the above various method embodiment, and the apparatus may be specifically applied to various electronic devices.

As shown in FIG. 6, an apparatus 600 for predicting a sequence of single-step behaviors of the present embodiment includes: a receiving unit 601, configured to receive a navigation graph of the task environment, instructions in natural language and an initial location of the robot in the navigation graph, where the navigation graph comprises nodes indicating locations in the task environment, coordinates of the nodes, and edges indicating connectivity between the locations; and a prediction unit 602, configured to predict sequentially a sequence of single-step behaviors executable by the robot to navigate the robot from the initial location to a destination.

In some embodiments, the prediction unit further includes an adaptive context generation subunit and a prediction subunit. The adaptive context generation subunit is configured to: generate, for each single step during the prediction, an adaptive context by adapting the navigation graph to a current prediction process corresponding to the single step. The prediction subunit is configured to predict a single-step behavior for the single-step based on at least the generated adaptive context and the instructions in natural language.

In some embodiments, the adaptive context generation subunit is further configured to: search for, in the navigation graph, valid node transitions between a current node corresponding to the single step and neighbor nodes, except for a previous node, of the current node; predict a behavior of a valid node transition based on coordinates of the current node, a previous node of the current node, and a neighbor node except for the previous node of the current node; and take the neighbor node as a new current node, and repeating steps of searching and predicting, until a distance between a node taken as the new current node and the current node of the current single step is within a preset value; and convert all of the found valid node transitions and the predicted behaviors thereof to graph format to generate the adaptive context for the each single step.

In some embodiments, the behaviors of the valid node transitions are predicted from a behavior set composed of: exit, turn right and move, turn left and move, and move forward.

In some embodiments, the adaptive context generation subunit is further configured to: determine heading of the robot at the current node by subtracting a coordinate of the previous node from a coordinate of the current node; determine heading of the robot at the neighbor node by subtracting the coordinate of the current node from a coordinate of a neighbor node; calculate a cross product of the heading of the robot at the current node and the heading of the robot at the neighbor node; and predict the single-step behavior of the valid node transition based on the calculated cross product.

In some embodiments, the prediction subunit is further configured to: predict the single-step behavior for the single-step based on the generated adaptive context, the instructions in natural language, and a current hidden state updated by a gated recurrent unit (GRU), wherein the GRU takes a previous single-step behavior of a previous single step as input and updates to obtain the current hidden state.

In some embodiments, the apparatus for predicting a sequence of single-step behaviors further includes a navigation graph creating unit, configured to: create a topological map of the task environment, with locations in the task environment as nodes of the topological map, and the connectivity between the locations as edges of the topological map; and determine the created topological map as the navigation graph of the task environment.

The apparatus 600 corresponds to the steps in the foregoing method embodiments. Therefore, the operations, features, and technical effects that can be achieved in the above method for predicting a sequence of single-step behaviors are also applicable to the apparatus 600 and the units contained therein, and detailed description thereof will be omitted.

According to an embodiment of the present disclosure, an electronic device and a readable storage medium are provided.

Figure 7:
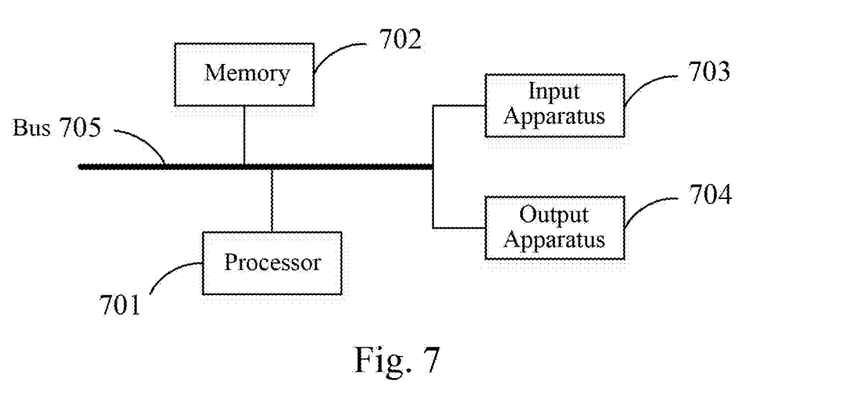
FIG. 7 is a block diagram of an electronic device according to an embodiment of the present disclosure.

As shown in FIG. 7, a block diagram of an electronic device of the method for predicting a sequence of single-step behaviors according to an embodiment of the present disclosure is illustrated. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 7, the electronic device includes: one or more processors 701, a memory 702, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations, for example, as a server array, a set of blade servers, or a multi-processor system. In FIG. 8, one processor 701 is used as an example.

The memory 702 is a non-transitory computer readable storage medium provided in an embodiments of the present disclosure. The memory stores instructions executable by at least one processor, so that the at least one processor performs the method for predicting a sequence of single-step behaviors provided by embodiments of the present disclosure. The non-transitory computer readable storage medium of some embodiments of the present disclosure stores computer instructions for causing a computer to perform the method for predicting a sequence of single-step behaviors provided in embodiments of the present disclosure.

The memory 702, as a non-transitory computer readable storage medium, may be used to store non-transitory software programs, non-transitory computer executable programs and modules, such as program instructions/modules corresponding to the method for predicting a sequence of single-step behaviors in embodiments of the present disclosure (for example, the receiving unit 601 and the prediction unit 602 as shown in FIG. 6). The processor 701 executes the non-transitory software programs, instructions, and modules stored in the memory 702 to execute various functional applications and data processing of the server, that is, to implement the method for predicting a sequence of single-step behaviors in the foregoing method embodiments.

The memory 702 may include a storage program area and a storage data area, where the storage program area may store an operating system and at least one function required application program; and the storage data area may store data created by the use of the electronic device for predicting a sequence of single-step behaviors. In addition, the memory 702 may include a high-speed random access memory, and may also include a non-transitory memory, such as at least one magnetic disk storage device, a flash memory device, or other non-transitory solid-state storage devices. In some embodiments, the memory 702 may optionally include memories remotely provided with respect to the processor 701, and these remote memories may be connected to the electronic device for predicting a sequence of single-step behaviors through a network. Examples of the above network include but are not limited to the Internet, intranet, local area network, mobile communication network, and combinations thereof.

The electronic device of the method for predicting a sequence of single-step behaviors may further include: an input apparatus 703 and an output apparatus 704. The processor 701, the memory 702, the input apparatus 703, and the output apparatus 704 may be connected through a bus 705 or in other methods. In FIG. 7, connection through the bus 705 is used as an example.

The input apparatus 703 may receive input digital or character information, and generate key signal inputs related to user settings and function control of the electronic device of the method for predicting a sequence of single-step behaviors, such as touch screen, keypad, mouse, trackpad, touchpad, pointing stick, one or more mouse buttons, trackball, joystick and other input apparatuses. The output apparatus 704 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated application specific integrated circuits (ASIC), computer hardware, firmware, software, and/or combinations thereof. These various embodiments may include: being implemented in one or more computer programs that may be executed and/or interpreted on a programmable system that includes at least one programmable processor. The programmable processor may be a dedicated or general purpose programmable processor, and may receive data and instructions from a memory system, at least one input apparatus, and at least one output apparatus, and transmit the data and instructions to the storage system, the at least one input apparatus, and the at least one output apparatus.

These computing programs, also referred to as programs, software, software disclosures, or codes, include machine instructions of a programmable processor, and may be implemented using high-level procedures and/or object-oriented programming languages, and/or assembly/machine languages. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

To provide interaction with a user, the systems and technologies described herein may be implemented on a computer, the computer has: a display apparatus for displaying information to the user, such as a Cathode Ray Tube (CRT) or an liquid crystal display (LCD) monitor; and a keyboard and pointing apparatus, such as a mouse or a trackball, and a user may use the keyboard and the pointing apparatus to provide input to the computer. Other types of apparatuses may also be used to provide interaction with the user. For example, the feedback provided to the user may be any form of sensory feedback, such as visual feedback, auditory feedback, or tactile feedback; and any form (including acoustic input, voice input, or tactile input) may be used to receive input from the user.

The systems and technologies described herein may be implemented in a computing system that includes backend components, e.g., as a data server, or in a computing system that includes middleware components, e.g., an application server, or in a computing system including front-end components, e.g., a user computer having a graphical user interface or a web browser through which a user may interact with embodiments of the systems and technologies described herein, or in a computing system including any combination of such backend components, middleware components, or front-end components. The components of the system may be interconnected by any form or medium of digital data communication, e.g., a communication network. Examples of communication networks include: Local Area Network (LAN), Wide Area Network (WAN), the Internet, and block chain networks.

The computer system may include a client and a server. The client and server are generally far from each other and usually interact through a communication network. The relationship between the client and the server is generated by computer programs that run on the corresponding computer and having a client-server relationship with each other.

The above description only provides an explanation of the preferred embodiments of the present disclosure and the technical principles used herein. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure, for example, technical schemes formed by the above-described features being interchanged with, but not limited to, technical features with similar functions disclosed in embodiments of the present disclosure.

What is claimed is:

1. A method for navigating a robot in a task environment, comprising:
   receiving, by a pre-trained sequential prediction model, a navigation graph of the task environment, instructions in natural language and an initial location of the robot in the navigation graph, wherein the navigation graph comprises nodes indicating locations in the task environment, coordinates of the nodes, and edges indicating connectivity between the locations; and
   predicting sequentially, by the pre-trained sequential prediction model, a sequence of single-step behaviors executable by the robot to navigate the robot from the initial location to a destination, wherein the predicting sequentially a sequence of single-step behaviors executable by the robot to navigate the robot from the initial location to a destination comprises:
   for each single step during the prediction:
   generating an adaptive context by adapting the navigation graph to a current prediction process corresponding to the single step, and
   predicting a single-step behavior for the single-step based on at least the generated adaptive context and the instructions in natural language, wherein the single-step behavior is performed at a target node being a current node, and for each single step during the prediction, the generating the adaptive context comprises:

step i: searching for, in the navigation graph, valid node transitions between the current node corresponding to the single step and neighbor nodes of the current node, wherein the neighbor nodes of the current node are not a previous node of the current node and are reachable by the robot from the current node without passing an intermediate node, and the previous node of the current node is a predicted node passed by the robot before the current node;
   step ii: predicting a behavior of each of the valid node transitions based on coordinates of the current node, the previous node of the current node, and a neighbor node of the current node;
   step iii: repeating steps i and ii by using the neighbor node as the current node until a distance between the neighbor node used as the current node and the target node of the current single step is greater than a preset value; and
   step iv: converting all of the found valid node transitions and the predicted behaviors thereof to graph format to generate the adaptive context for the each single step.

2. The method according to claim 1, wherein the behaviors of the valid node transitions are predicted from a behavior set composed of: exit, turn right and move, turn left and move, and move forward.

3. The method according to claim 1, wherein step ii comprises:
   determining heading of the robot at the current node by subtracting a coordinate of the previous node from a coordinate of the current node;
   determining heading of the robot at the neighbor node by subtracting the coordinate of the current node from a coordinate of a neighbor node;
   calculating a cross product of the heading of the robot at the current node and the heading of the robot at the neighbor node; and
   predicting the single-step behavior of the valid node transition based on the calculated cross product.

4. The method according to claim 1, wherein the predicting the single-step behavior for the single-step based on at least the generated adaptive context and the instructions in natural language, comprises:
   predicting the single-step behavior for the single-step based on the generated adaptive context, the instructions in natural language, and a current hidden state updated by a gated recurrent unit (GRU), wherein the GRU takes a previous single-step behavior of a previous single step as input and updates to obtain the current hidden state.

5. The method according to claim 1, wherein the method further comprises:
   creating a topological map of the task environment, with locations in the task environment as nodes of the topological map, and the connectivity between the locations as edges of the topological map; and
   determining the created topological map as the navigation graph of the task environment.

6. An electronic device, comprising:
   at least one processor; and
   a memory storing instructions executable to cause the at least one processor to perform operations, the operations comprising:
   receiving, by a pre-trained sequential prediction model, a navigation graph of the task environment, instructions in natural language and an initial location of the robot in the navigation graph, wherein the navigation graph comprises nodes indicating locations in the task environment, coordinates of the nodes, and edges indicating connectivity between the locations; and predicting sequentially, by the pre-trained sequential prediction model, a sequence of single-step behaviors executable by the robot to navigate the robot from the initial location to a destination, wherein the predicting sequentially a sequence of single-step behaviors executable by the robot to navigate the robot from the initial location to a destination comprises:

for each single step during the prediction:

generating an adaptive context by adapting the navigation graph to a current prediction process corresponding to the single step, and predicting a single-step behavior for the single-step based on at least the generated adaptive context and the instructions in natural language, wherein the single-step behavior is performed at a target node being a current node, and for each single step during the prediction, the generating the adaptive context comprises:

step i: searching for, in the navigation graph, valid node transitions between the current node corresponding to the single step and neighbor nodes of the current node, wherein the neighbor nodes of the current node are not a previous node of the current node and are reachable by the robot from the current node without passing an intermediate node, and the previous node of the current node is a predicted node passed by the robot before the current node;

step ii: predicting a behavior of each of the valid node transitions based on coordinates of the current node, the previous node of the current node, and a neighbor node of the current node;

step iii: repeating steps i and ii by using the neighbor node as the current node until a distance between the neighbor node used as the current node and the target node of the current single step is greater than a preset value; and step iv: converting all of the found valid node transitions and the predicted behaviors thereof to graph format to generate the adaptive context for the each single step.

7. The device according to claim 6, wherein the behaviors of the valid node transitions are predicted from a behavior set composed of: exit, turn right and move, turn left and move, and move forward.

8. The device according to claim 6, wherein step ii comprises:

determining heading of the robot at the current node by subtracting a coordinate of the previous node from a coordinate of the current node;

determining heading of the robot at the neighbor node by subtracting the coordinate of the current node from a coordinate of a neighbor node;

calculating a cross product of the heading of the robot at the current node and the heading of the robot at the neighbor node; and predicting the single-step behavior of the valid node transition based on the calculated cross product.

9. The device according to claim 6, wherein the predicting the single-step behavior for the single-step based on at least the generated adaptive context and the instructions in natural language, comprises:

predicting the single-step behavior for the single-step based on the generated adaptive context, the instructions in natural language, and a current hidden state updated by a gated recurrent unit (GRU), wherein the GRU takes a previous single-step behavior of a previous single step as input and updates to obtain the current hidden state.

10. The device according to claim 6, wherein the operations further comprise:

creating a topological map of the task environment, with locations in the task environment as nodes of the topological map, and the connectivity between the locations as edges of the topological map; and determining the created topological map as the navigation graph of the task environment.

11. A non-transitory computer readable storage medium storing one or more computer programs, that when executed by a processor, cause the processor to perform operations, the operations comprising:

receiving, by a pre-trained sequential prediction model, a navigation graph of the task environment, instructions in natural language and an initial location of the robot in the navigation graph, wherein the navigation graph comprises nodes indicating locations in the task environment, coordinates of the nodes, and edges indicating connectivity between the locations; and predicting sequentially, by the pre-trained sequential prediction model, a sequence of single-step behaviors executable by the robot to navigate the robot from the initial location to a destination, wherein the predicting sequentially a sequence of single-step behaviors executable by the robot to navigate the robot from the initial location to a destination comprises:

for each single step during the prediction:

generating an adaptive context by adapting the navigation graph to a current prediction process corresponding to the single step, and predicting a single-step behavior for the single-step based on at least the generated adaptive context and the instructions in natural language, wherein the single-step behavior is performed at a target node being a current node, and for each single step during the prediction, the generating the adaptive context comprises:

step i: searching for, in the navigation graph, valid node transitions between the current node corresponding to the single step and neighbor nodes of the current node, wherein the neighbor nodes of the current node are not a previous node of the current node and are reachable by the robot from the current node without passing an intermediate node, and the previous node of the current node is a predicted node passed by the robot before the current node;

step ii: predicting a behavior of each of the valid node transitions based on coordinates of the current node, the previous node of the current node, and a neighbor node of the current node;

step iii: repeating steps i and ii by using the neighbor node as the current node until a distance between the neighbor node used as the current node and the target node of the current single step is greater than a preset value; and step iv: converting all of the found valid node transitions and the predicted behaviors thereof to graph format to generate the adaptive context for the each single step.

12. The medium according to claim 11, wherein the behaviors of the valid node transitions are predicted from a behavior set composed of: exit, turn right and move, turn left and move, and move forward.

13. The medium according to claim 11, wherein step ii comprises:

determining heading of the robot at the current node by subtracting a coordinate of the previous node from a coordinate of the current node;

determining heading of the robot at the neighbor node by subtracting the coordinate of the current node from a coordinate of a neighbor node;

calculating a cross product of the heading of the robot at the current node and the heading of the robot at the neighbor node; and predicting the single-step behavior of the valid node transition based on the calculated cross product.

14. The medium according to claim 11, wherein the predicting the single-step behavior for the single-step based on at least the generated adaptive context and the instructions in natural language, comprises:

predicting the single-step behavior for the single-step based on the generated adaptive context, the instructions in natural language, and a current hidden state updated by a gated recurrent unit (GRU), wherein the GRU takes a previous single-step behavior of a previous single step as input and updates to obtain the current hidden state.

\* \* \* \* \*